Patented Dec. 30, 1941

2,268,491

UNITED STATES PATENT OFFICE 2,268,491

COATING COMPOSITION

George D. Martin, Nitro, W. Va., assignor to Monsanto Chemical Company, St. Louis, Mo., a corporation of Delaware No Drawing. Application January 9, 1939,
Serial No. 249,849

12 Claims. (Cl. 106—263)

The present invention relates to a coating composition and more particularly to a coating composition containing a drying oil, for example paint, varnish, enamel, linoleum and the like.

It is the usual practice in the manufacture of coating compositions containing drying oils to incorporate a positive oxidation catalyst which usually consists of a heavy metal salt such as a salt of cobalt, iron, manganese or lead. This positive oxidation catalyst is commonly referred to as a "drier" and imparts certain beneficial properties, as for instance hastening the formation of a hard, dry film. The drier likewise has certain objectionable properties. Thus the oxidation once initiated may continue too far or an oxidation may take place in the bulk state with the formation of a film or "skin" on the surface during storage, etc.

The tendency of a paint to skin is particularly noticeable in the presence of certain pigments and in paint containing appreciable quantities of China-wood oil or polymerized linseed oil. This property eliminates from commercial use certain compositions which possess otherwise desirable features. The prevention of skinning is an important problem in dipping operations where the paint is necessarily exposed to the oxidizing influence of the atmosphere for extended periods of time.

It is thus desirable to inhibit the oxidation of drying oil compositions sufficiently to prevent skinning during manufacture, during dipping operations and during storage. Once a film is formed, however, the beneficial action of a drier in forming a hard dry film in a short time must preferably be unimpaired without however a continued oxidation resulting in subsequent deterioration and cracking. The highly selective action required of an anti-skinning agent is thus evident.

It is an object of the present invention to provide a drying oil composition of improved properties.

Another object is to provide a drying oil composition of improved resistance to skinning in bulk or in the container.

A further object is to provide a coating composition comprising a drying oil and possessing improved properties.

A still further object is to provide a class of materials which substantially prevent undesirable oxidation of the drying oil composition. Other objects will be hereinafter shown.

In accordance with the present invention it has been discovered that esters of trivalent phosphorus acids are important and desirable adjuvants to drying oil coating compositions. These products, in general, are obtainable by reacting a phenol or alcohol or mixtures thereof with a trivalent phosphorus compound capable of forming an ester, as for example a phosphorus tri halide. By this means a mono or dihalogen containing ester is obtainable as well as the neutral ester resulting from complete replacement of the halogen. Halogen and halogen free acid esters as well as neutral esters of trivalent phosphorus acids have been found to be effective anti-skinning agents and are included within the scope of the present invention.

An example of a typical preparation is that of para hydroxy phenyl phosphorous acid dichloride. Substantially equimolecular proportions of hydroquinone and phosphorus trichloride were reacted in the presence of a suitable inert organic solvent, for example ether. After isolation of the product by suitable means, it was analyzed for phosphorus and found to contain 14.6% phosphorus. The calculated value for para hydroxy phenyl phosphorous acid dichloride,

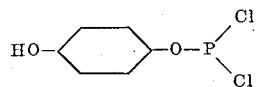

is 14.7% phosphorus. As a further typical example of the invention, the monochloride was prepared from the above product by partial hydrolysis. The product obtained was found upon analysis to contain 15.9% phosphorus. The calculated value for p-hydroxy phenyl phosphorous acid mono chloride,

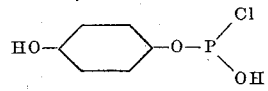

is 16.0% phosphorus. Both of the above described compounds exhibited good anti-skinning action as is hereinafter shown.

It is to be understood that other methods of preparing the preferred compounds may be employed. For example, toluene was condensed with phosphorus trichloride in the presence of aluminum chloride to form toluene phosphinous acid dichloride

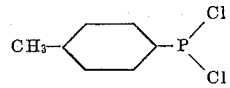

which was then reacted with catechol to produce one of the preferred class of materials by the replacement of the halogen atoms with an ortho phenylene group as follows

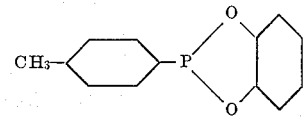

o-phenylene p-tolyl phosphinous acid

The present invention does not relate to the preparation of the preferred materials nor is it limited thereto. Esters of phosphorous acids are well known and their preparation is adequately described in the chemical literature.

The present invention more particularly relates to the use in drying oil compositions, of phosphorous esters of the formula

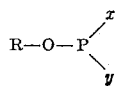

where R is an aryl radical and $x$ is halogen, OH, OR' or R', R' being an aryl or alkyl group and $y$, which may be the same or different than $x$ is likewise halogen, OH, OR' or R' R' being an aryl or alkyl group and in addition may be O— attached to R.

Other typical examples of the preferred class of materials according to the invention comprise o-phenylene phosphorous acid chloride

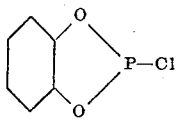

p-hydroxy phenyl o-phenylene phosphite

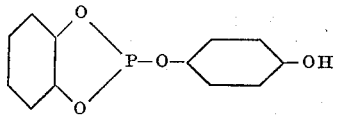

o-chlor phenyl o-phenylene phosphite

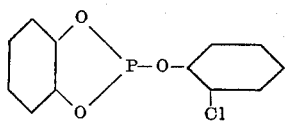

p-tolyl o-phenylene phosphite

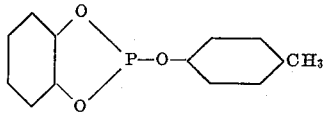

β-naphthyl phosphorous acid dichloride

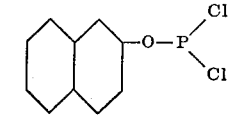

diamyl, p-hydroxy phenyl phosphorous acid dichloride

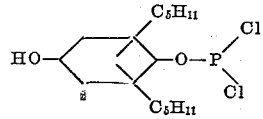

p-tolyl phosphorous acid dichloride

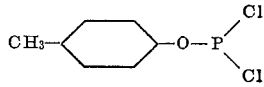

chlor phenyl phosphorous acid dichloride

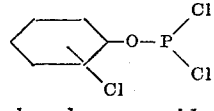

di chlorphenyl phosphorous acid monochloride

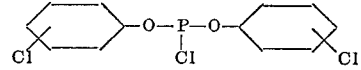

di-p-tolyl phosphorous acid monochloride

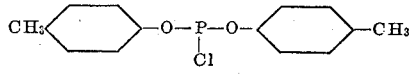

the salicylic acid ester of phosphorous acid monochloride of the formula, according to R. Anschutz and W. Emery (Ann. 239, p. 304), of

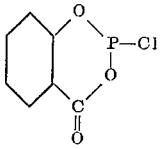

p-phenylene di(phosphorous acid dichloride)

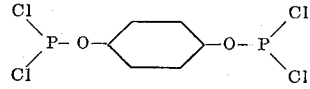

o-phenylene phosphite

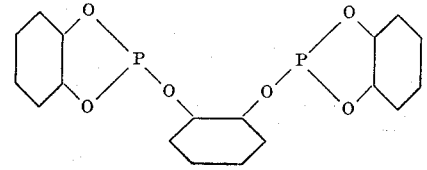

butyl o-phenylene phosphite

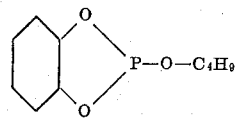

o-diphenyl phosphorous acid dichloride

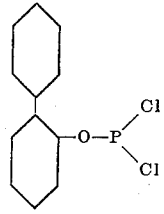

5 hydroxy 1 naphthyl phosphorous acid

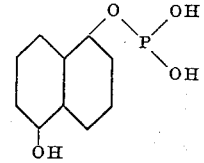

β naphthyl phosphorous acid

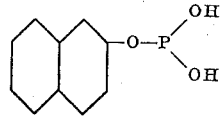

p-tolyl phosphorous acid

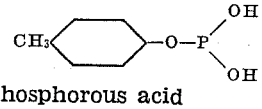

p-diphenyl phosphorous acid

p-hydroxy phenyl o-phenylene phosphite

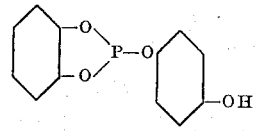

and dibutyl p-hydroxy phenyl phosphite

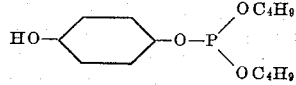

As one method of operating the present invention, portions of a paint, varnish or enamel, which readily skins on contact with the air, were placed in suitable containers, a small proportion of one of the new class of anti-skinning agents incorporated therein and observations made at regular intervals as to the skinning of the composition, whereby it was found that the new and preferred class of anti-skinning agents prevented the formation of a skin for extended periods of time.

As a specific embodiment of the present invention 20 grams of a quick drying enamel comprising a 25 gallon China wood oil varnish containing 2.5% of a mixed lead manganese and cobalt dryer was placed in a wide mouth open container of 50 c. c. capacity. 20 milligrams of anti-skinning agent was incorporated therein and a comparison made as to the skinning time of the same enamel containing no inhibitor of skin formation, a temperature of 25° C. being maintained throughout the test. Typical results from a series of such tests are given in Table I.

Table I

| Anti-skinning agent | Concentration employed | Days before formation of skin |
|---|---|---|
| | Per cent | |
| Blank | None | 1 |
| p-Hydroxy phenyl phosphorous acid dichloride | 0.1 | 13 |
| p-Hydroxy phenyl phosphorous acid monochloride | 0.1 | 15 |
| o-Phenylene phosphorous acid chloride | 0.1 | 16 |
| Di chlorphenyl phosphorous acid chloride | 0.1 | 15 |

The above results clearly show the very good anti-skinning properties of the compounds of the present invention as exemplified by halogen esters of trivalent phosphorus acids.

In general it was found that the neutral esters were even more effective as anti-skinning agents, and as a further specific embodiment of the invention tests were carried out in the manner hereinbefore described employing as inhibitors of skin formation substantially halogen free esters of trivalent phosphorus acids. The results of such tests are shown in Table II.

Table II

| Anti-skinning agent | Concentration employed | Days before formation of skin |
|---|---|---|
| | Per cent | |
| Blank | None | 1 |
| Butyl o-phenylene phosphite | 0.1 | 44 |
| o-Phenylene phosphite | 0.1 | 40 |
| Tolyl o-phenylene phosphite | 0.1 | 31 |
| o-Chlor phenyl o-phenylene phosphite | 0.1 | 40 |

The above data show that the compounds of the present invention as exemplified by the neutral esters of trivalent phosphorus acids are excellent anti-skinning agents.

The present invention is not limited to the specific examples herein given to illustrate the invention. Other and further members of the new class of anti-skinning agents may be incorporated in a drying oil composition thereby effecting desirable improvements. For example diamyl p-hydroxy phenyl phosphorus acid dichloride and meta hydroxy phenyl phosphorus acid dichloride were tested in the manner hereinbefore described and found to inhibit the formation of a skin for 8 and 6 days respectively whereas without an inhibitor of skin formation a thick skin formed in one day.

Likewise other methods of testing the preferred materials may be employed and other means may be utilized to show their desirable properties. For example instead of carrying out the tests in open containers, tests may be run employing closed containers so as to more nearly approximate the conditions met with in coating compositions put up in sealed containers for storage and distribution. The desirable properties of the preferred materials were readily shown upon testing the preferred materials in this manner. For example 5 hydroxy 1 naphthyl phosphorous acid and o-phenylene p-tolyl phosphinous acid prevented the formation of a skin for 30 days and 32 days respectively when tested by the closed container method whereas a blank, that is the same drying oil composition, in a closed container, but to which no inhibitor of skin formation was added, formed a thick skin in two days. Di butyl para hydroxy phenyl phosphite and o-phenylene p-hydroxy phenyl phosphite gave very exceptional results when tested in this manner, preventing the formation of skin for many months.

While the amount of preferred class of materials employed in the specific embodiments of the invention as set forth above is 0.1% based on the weight of the total drying oil composition, the quantities employed may be varied depending on the specific composition of the coating material. Generally it is found that less than 1% of the preferred material will be sufficient. Ordinarily 0.05 to 0.50% is sufficient. It is obvious that the processes and compositions described herein may be varied widely in their details without departing from the spirit or scope of the present invention. The present invention is limited solely by the appended claims.

What is claimed is:

1. A coating composition containing a drying oil of the type which rapidly develops a skin in bulk condition having incorporated therein a positive oxidation catalyst and a controller of oxidation comprising an ester of a trivalent phosphorus acid wherein at least one of the ester forming groups is an aryl or arylene group.

2. A coating composition containing a drying oil of the type which rapidly develops a skin in bulk condition having incorporated therein a positive oxidation catalyst and a controller of oxidation comprising a compound possessing the structure

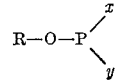

where R is an aromatic carbocyclic radical and $x$ is a member of a group consisting of halogen, OH, OR' or R' and $y$ which may be the same or different than $x$, is a member of a group consisting of halogen, OH, OR' or R', R' being a member of a group consisting of aryl groups which may be substituted and alkyl groups, and in addition $y$ may be O— attached to R.

3. A coating composition containing a drying oil of the type which rapidly develops a skin in bulk condition having incorporated therein a positive oxidation catalyst and a controller of oxidation comprising a compound possessing the structure

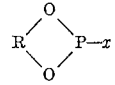

where R is an arylene radical and $x$ is selected from a group consisting of halogen, OH, OR' or R', R' being an organic radical the same or different than R.

4. A coating composition containing a drying oil of the type which rapidly develops a skin in bulk condition having incorportaed therein a positive oxidation catalyst and a controller of oxidation comprising an ester of phosphorous acid, P(OH)₃ wherein one or more of the hydrogen atoms are replaced by an aryl radical selected from the benzene and naphthalene series.

5. A coating composition containing a drying oil of the type which rapidly develops a skin in bulb condition having incorporated therein a positive oxidation catalyst and a controller of oxidation comprising an ester of phosphorous acid, P(OH)₃ wherein at least one of the hydrogen atoms is replaced by an hydroxy substituted aryl radical.

6. A coating composition containing a drying oil of the type which rapidly develops a skin in bulk condition having incorporated therein a positive oxidation catalyst and a controller of oxidation comprising an ortho phenylene ester of phosphorous acid.

7. A coating composition containing a drying oil of the type which rapidly develops a skin in bulk condition having incorporated therein a positive oxidation catalyst and a controller of oxidation comprising a substantially neutral ortho phenylene phosphite.

8. A coating composition containing a drying oil of the type which rapidly develops a skin in bulk condition having incorporated therein a positive oxidation catalyst and a controller of oxidation comprising di butyl para hydroxy phenyl phosphite.

9. A coating composition containing a drying oil of the type which rapidly develops a skin in bulk condition having incorporated therein a positive oxidation catalyst and a controller of oxidation comprising o-phenylene phosphite.

10. A coating composition containing a drying oil of the type which rapidly develops a skin in bulk condition having incorporated therein a positive oxidation catalyst and a controller of oxidation comprising a compound possessing the structure

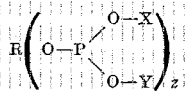

wherein R is an aryl radical selected from the benzene and naphthalene series and X and Y are selected from a group consisting of hydrogen, alkyl or the vicinal carbon atoms of a phenylene group and z is an integer less than three.

11. A coating composition containing a drying oil of the type which rapidly develops a skin in bulk condition having incorporated therein a positive oxidation catalyst and a controller of oxidation comprising a compound possessing the structure

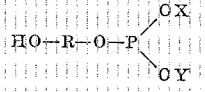

wherein R is an aryl radical selected from the benzene and naphthalene series and X and Y are selected from a group consisting of hydrogen, alkyl or the vicinal carbon atoms of a phenylene group.

12. A coating composition containing a drying oil of the type which rapidly develops a skin in bulk condition having incorporated therein a positive oxidation catalyst and a controller of oxidation comprising a compound possessing the structure

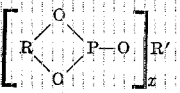

wherein R is a phenylene radical, R' is an aryl radical of the benzene series and $x$ is an integer less than three.

GEORGE D. MARTIN.